United States Patent
Shim et al.

(10) Patent No.: US 9,738,809 B2
(45) Date of Patent: Aug. 22, 2017

(54) COATING LAYER FOR ANTI-GLARE FILM AND ANTI-GLARE FILM COMPRISING THE SAME

(75) Inventors: Jae-Hoon Shim, Daejeon (KR); Joon-Koo Kang, Daejeon (KR); Jae-Pil Koo, Daejeon (KR); Yeong-Rae Chang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1068 days.

(21) Appl. No.: 13/579,822

(22) PCT Filed: Feb. 17, 2011

(86) PCT No.: PCT/KR2011/001050
§ 371 (c)(1),
(2), (4) Date: Aug. 17, 2012

(87) PCT Pub. No.: WO2011/102650
PCT Pub. Date: Aug. 25, 2011

(65) Prior Publication Data
US 2012/0321874 A1   Dec. 20, 2012

(30) Foreign Application Priority Data
Feb. 19, 2010 (KR) .................. 10-2010-0014931

(51) Int. Cl.
| | | |
|---|---|---|
| C09D 5/33 | (2006.01) | |
| C08K 5/07 | (2006.01) | |
| C09D 175/14 | (2006.01) | |
| B32B 27/04 | (2006.01) | |
| B05D 5/06 | (2006.01) | |
| C09D 133/08 | (2006.01) | |
| G02B 1/111 | (2015.01) | |
| C08K 3/22 | (2006.01) | |
| C08K 3/36 | (2006.01) | |
| C08L 25/14 | (2006.01) | |

(52) U.S. Cl.
CPC .............. *C09D 133/08* (2013.01); *C08K 3/22* (2013.01); *C08K 3/36* (2013.01); *G02B 1/111* (2013.01); *C08L 25/14* (2013.01); *Y10T 428/249921* (2015.04); *Y10T 428/268* (2015.01)

(58) Field of Classification Search
CPC .......... C08K 3/22; C08K 3/36; C09D 133/08; C08L 25/14
See application file for complete search history.

(56) References Cited

U.S. PATENT DOCUMENTS

| | | | |
|---|---|---|---|
| 2007/0104896 A1* | 5/2007 | Matsunaga et al. | 428/1.3 |
| 2007/0146887 A1 | 6/2007 | Ikeda et al. | |
| 2007/0253064 A1* | 11/2007 | Ookubo et al. | 359/599 |
| 2008/0212187 A1* | 9/2008 | Yoshinari | 359/601 |
| 2009/0128917 A1* | 5/2009 | Yoshinari | G02B 5/0226 359/601 |
| 2010/0097705 A1* | 4/2010 | Furui et al. | 359/599 |

FOREIGN PATENT DOCUMENTS

| | | |
|---|---|---|
| CN | 1922008 | 2/2007 |
| JP | 2004025650 A | 1/2004 |
| JP | 2004-082613 | 3/2004 |
| JP | 2004-125958 | 4/2004 |
| JP | 2008-197232 | 8/2008 |
| JP | 2008-203836 A | 9/2008 |
| JP | 2009-003451 A | 1/2009 |
| JP | 4215458 | 1/2009 |
| JP | 2009-75248 A | 4/2009 |
| JP | 2009-169409 A | 7/2009 |
| JP | 2009-204728 A | 9/2009 |
| JP | 2010-033053 A | 2/2010 |
| JP | 2010033053 A | 2/2010 |
| KR | 10-2009-0130674 A | 12/2009 |
| WO | 01/27193 A1 | 4/2001 |
| WO | WO2008020612 A1 * | 2/2008 |
| WO | 2008/140282 A2 | 11/2008 |
| WO | 2008/140283 A1 | 11/2008 |

OTHER PUBLICATIONS

Wicks, Jr. et al. "Coatings". Kirk-Othmer Encyclopedia of Chemical Technology. John Wiley & Sons, Inc., (2013); pp. 1-86.*

* cited by examiner

*Primary Examiner* — Prashant J Khatri
(74) *Attorney, Agent, or Firm* — Dentons US LLP

(57) ABSTRACT

The present invention relates to a coating layer for an anti-glare film that can prevent glaring by reflection of external light on a surface of a display and an anti-glare film comprising the same. The coating layer for an anti-glare film according to an exemplary embodiment of the present invention comprises a binder resin, organic particulates, and inorganic particulates, and differences differences between refractive indexes of the binder resin and the organic particulates and between refractive indexes of the binder resin and inorganic particulates are each 0.3 or less. The coating layer for an anti-glare film according to an exemplary embodiment of the present invention can provide an anti-glare film having excellent anti-glare property, distinctness-of-image, and contrast, such that the coating layer can be applied to a display having high resolution, and has excellent scratch resistance in terms of a coating thickness of a thin film, such that it is easy to enlarge a polarizing plate.

5 Claims, No Drawings

COATING LAYER FOR ANTI-GLARE FILM AND ANTI-GLARE FILM COMPRISING THE SAME

TECHNICAL FIELD

This application is a National Stage Entry of International Application No. PCT/KR2011/001050, filed Feb. 17, 2011, and claims the benefit of Korean Application No. 10-2010-0014931, filed on Feb. 19, 2010, which is hereby incorporated by reference in its entirety for all purposes as if fully set forth herein. The present invention relates to a coating layer for an anti-glare film that can prevent glare by reflection of external light on a surface of a display and an anti-glare film comprising the same.

BACKGROUND ART

As consumers demand high quality products having a large monitor, high image quality, multi-functions and high performance that conform with the recent trend of high speed and high density in information transmission, and diversity and multi-functions of transmission media, a flat panel display (FPD) having a large monitor has appeared. In accordance with enlargement and slimness of displays and an increase in demand of notebook PCs, various types of flat panel displays such as LCDs, PDPs, rear-projection TVs have been developed and commercialized. However, if these displays are exposed to external light such as sunlight, a user feels fatigue in his/her eyes or a headache due to light reflecting from surfaces, and images made in displays are not clearly considered.

In order to solve the disadvantages, an anti-glare effect is implemented by forming unevenness on a surface of a display to scatter external light on the surface. However, there is a problem in that it causes distinctness-of-image to reduce in a display having high resolution. In order to improve the problem, a method for inducing internal haze by adding particles for inducing internal scattering to a coating layer is used, but has many problems.

Korean Patent No. 10-046782 discloses an anti-glare coating layer for high resolution using a first particulate having a difference in refractive index of 0.2 to 0.5 from an acrylate-based binder resin and an average diameter of 0.05 to 1 μm and a second particulate having a difference in refractive index of 0.1 or less from the acrylate-based binder resin and an average particle diameter of 0.5 to 3 μm, but there is a disadvantage in that the difference between the refractive indexes of the binder resin and the first particulate is large, such that contrast is reduced.

Meanwhile, Korean Patent No. 10-0378340 discloses an anti-glare coating layer in which at least two light transmission particulates are included in a binder resin, a difference in refractive index of the light transmission particulates to the binder is 0.03 to 0.2, and each of the light transmission particulates has different refractive index, but there are disadvantages in that an anti-glare property is low while the distinctness-of-image and haze value are the same, contrast is reduced due to a haze of 10% or more, and scratch resistance is reduced due to organic particles.

In addition, Korean Patent No. 10-0296369 discloses an anti-glare coating layer in which a light transmission diffusion agent is included in a binder resin, an external haze value by surface unevenness is 7 to 30, and an internal haze value by the light transmission diffusion agent is 1 to 15, but there is a disadvantage in that contrast is reduced due to a high surface haze value.

DISCLOSURE

Technical Problem

In general, as a fine particle included in order to provide a light scattering effect to an anti-glare film, an organic particulate is mainly used.

However, in this case, since strength of a coating film is weak, there is a problem in that a scratch is easily formed, and if the coating film is coated in such a way that the thickness thereof is thick in order to prevent the problem, there are problems in that fine cracks are formed in the coating film in a manufacturing process of a polarizing plate of a large-sized display to increase a defective ratio and a cut surface is broken when the polarizing plate is cut because of brittleness of the binder resin.

The present invention has been made in an effort to provide an anti-glare coating composition having excellent anti-glare and scratch resistance properties and particularly excellent scratch resistance and pencil hardness as a thin film to easily manufacture a large-sized polarizing plate and an anti-glare film for a high resolution display manufactured by using the same.

Technical Solution

An exemplary embodiment of the present invention provides a coating layer for an anti-glare film having excellent scratch resistance, comprising a binder resin, organic particulates, and inorganic particulates, wherein differences between refractive indexes of the binder resin and the organic particulates and between refractive indexes of the binder resin and inorganic particulates are each 0.3 or less.

Another exemplary embodiment of the present invention provides an anti-glare film comprising the coating layer for the anti-glare film.

Yet another exemplary embodiment of the present invention provides a composition for an anti-glare film, comprising a binder resin, organic particulates, and inorganic particulates, wherein differences between refractive indexes of the binder resin and the organic particulates and between refractive indexes of the binder resin and inorganic particulates are each 0.3 or less.

Still another exemplary embodiment of the present invention provides a method for manufacturing an anti-glare film, comprising 1) coating a composition for an anti-glare film which comprises a binder resin, organic particulates, and inorganic particulates and in which differences between refractive indexes of the binder resin and the organic particulates and between refractive indexes of the binder resin and inorganic particulates are each 0.3 or less, on a substrate, and 2) curing the composition.

Advantageous Effects

According to the exemplary embodiments of the present invention, a coating layer for an anti-glare film according to an exemplary embodiment of the present invention can provide an anti-glare film having excellent anti-glare property, distinctness-of-image, and contrast, such that the coating layer can be applied to a display having high resolution and has excellent scratch resistance property in terms of a coating thickness of a thin film, such that it is easy to enlarge a polarizing plate.

BEST MODE

Hereinafter, the present invention will be described in detail.

The coating layer for an anti-glare film according to an exemplary embodiment of the present invention comprises a binder resin, organic particulates, and inorganic particulates, and differences between refractive indexes of the binder resin and the organic particulates and between refractive indexes of the binder resin and inorganic particulates are each 0.3 or less.

It is preferable that the total content of the organic particulate and the inorganic particulate is in the range of 1 to 30 parts by weight on the basis of 100 parts by weight of the binder resin. That is, it is preferable that the sum of the total amount of the particulates comprising the organic particulates and the inorganic particulates is 1 to 30 parts by weight on the basis of 100 parts by weight of the binder resin. If the total content of the organic particulates and the inorganic particulates is less than 1 parts by weight on the basis of 100 parts by weight of the binder resin, a haze value by internal scattering is not sufficiently implemented, and if it is more than 30 parts by weight, since a coating property becomes poor and a haze value by internal scattering becomes excessively large, a contrast ratio is reduced, which is not preferable.

It is preferable that the content of the inorganic particulates is in the range of 20 to 80 parts by weight on the basis of 100 parts by weight of the organic particulates. If the amount of the inorganic particulates is less than 20 parts by weight on the basis of 100 parts by weight of the organic particulates, scratch resistance property is weakened by the organic particulates protruding from the surface, and if the amount is more than 80 parts by weight, the surface becomes rough and crack defects are formed on the coating surface, which are not preferable.

In the organic particulates, the difference between the average refractive indexes of the binder resin and the organic particulates is preferably 0.3 or less and more preferably 0.02 to 0.2. If the difference between the refractive indexes is less than the lower limit, it is difficult to obtain a sufficient haze value by the internal scattering, and if it is more than the upper limit, transmissivity is decreased while the haze value is increased because the internal scattering is increased, such that a contrast ratio is reduced, which is not preferable.

It is preferable that the organic particulate has a spherical shape, and the particle diameter is in the range of 1 to 7 μm. If the diameter is less than 1 μm, a scattering property is reduced, such that a sufficient haze value cannot be obtained, which is not preferable, and if it is more than 7 μm, the thickness of the coating film is increased, such that the film is cracked or broken, which is not preferable.

The organic particulate may use one or more selected from polystyrene, polymethylmethacrylate, polymethylacrylate, polyacrylate, polyacrylate-co-styrene, poly-methylacrylate-co-styrene, polymethylmethacrylate-co-styrene, polycarbonate, polyvinyl chloride, polybutyleneterephthalate, polyethyleneterephthalate, polyamides, polyimides, polysulfone, polyphenylene oxide, polyacetal, epoxy resin, phenol resin, silicon resin, melamine resin, benzoguamine, polydivinylbenzene, polydivinylbenzene-co-styrene, poly-divinylbenzene-co-acrylate, polydiallylphthalate and triallylisocyanurate polymer, or two or more copolymers thereof.

It is preferable that the organic particulate has a spherical shape, and the particle diameter is in the range of 2 to 10 μm. If the diameter is less than 2 μm, the particle is embedded in the binder resin, such that an external haze cannot be implemented, and if it is more than 10 μm, the thickness of the coating film is increased, which is not preferable.

In the inorganic particulates, the difference between the average refractive indexes of the binder resin and the organic particulates is preferably 0.3 or less and more preferably 0.02 to 0.2. If the difference between the refractive indexes is less than the lower limit, it is difficult to obtain a sufficient haze value by the internal scattering, and if it is more than the upper limit, transmissivity is decreased while the haze value is increased because the internal scattering is increased, such that a contrast ratio is reduced, which is not preferable.

The inorganic particulate may use a single substance selected from silica, silicon particle, aluminum hydroxide, magnesium hydroxide, alumina, zirconia, and titania, or two or more mixtures thereof, but is not limited thereto.

An acryl-based binder resin may be used as the binder resin. The kind of acryl-based binder resin is not particularly limited, and if it is known in the art, it can be used without a particular limit. As examples of the acryl-based binder resin, an acrylate monomer, an acrylate oligomer, or a mixture thereof may be used. In this case, it is preferable that the acrylate monomer or the acrylate oligomer comprises at least one acrylate functional group that can participate in a curing reaction.

The kind of acrylate monomer and acrylate oligomer is not particularly limited, and the kind generally used in the art to which the present invention belongs may be used without a limit.

As the acrylate oligomer, a urethane acrylate oligomer, an epoxy acrylate oligomer, a polyester acrylate, a polyether acrylate or a mixture thereof may be used. As the acrylate monomer, dipentaerythritol hexaacrylate, dipentaerythritol hydroxy pentaacrylate, pentaerythritol tetraacrylate, pentaerythritol triacrylate, trimethylene propyl triacrylate, propoxylated glycerol triacrylate, trimethylopropane ethoxy triacrylate, 1,6-hexanedioldiacrylate, propoxylated glycero triacrylate, tripropylene glycol diacrylate, ethyleneglycol diacrylate or a mixture thereof may be preferably used, but it is not limited thereto.

In particular, the coating layer for the anti-glare film according to the exemplary embodiment of the present invention may provide an anti-glare film having excellent anti-glare property, distinctness-of-image and contrast by comprising the organic particulates and the inorganic particulates in the single coating layer together, such that the layer can be applied to a display having high resolution, and has excellent scratch resistance in the coating thickness of the thin film, such that it is easy to enlarge a polarizing plate.

In addition, since the coating layer for the anti-glare film according to the exemplary embodiment of the present invention has excellent dispersity of the organic particulates and the inorganic particulates included in the coating layer, it is possible to form a single particle layer without an overlapping phenomenon of the organic particulates and the inorganic particulates.

The coating layer for the anti-glare film according to the exemplary embodiment of the present invention has excellent anti-glare property, distinctness-of-image, contrast, mechanical strength of the final film, and scratch resistance.

The thickness of the coating layer for the anti-glare film is preferably 1 to 20 μm and more preferably 1 to 4 μm. This is because the thinner the coating layer is, the lower the possibility of crack is. However, since the purpose of forming the coating layer is sufficiently implemented, the above thickness range may be appropriately controlled by a person with ordinary skill in the art within the above range in consideration of this purpose.

In addition, the anti-glare film according to the exemplary embodiment of the present invention comprises the coating layer for the anti-glare film.

In addition, a composition for an anti-glare film according to an exemplary embodiment of the present invention comprises a binder resin, organic particulates, and inorganic particulates, and differences differences between refractive indexes of the binder resin and the organic particulates and between refractive indexes of the binder resin and inorganic particulates are each 0.3 or less.

In the composition for the anti-glare film according to the exemplary embodiment of the present invention, since the description on the binder resin, the organic particulates and the inorganic particulates is the same as the above description, a detailed description thereof will be omitted.

The composition for the anti-glare film according to the exemplary embodiment of the present invention may further comprise 50 to 500 parts by weight of solvent on the basis of 100 parts by weight of the binder resin.

The kind of solvent is not particularly limited, but an organic solvent may be generally used.

It is preferable that the solvent is used in the amount of 50 to 500 parts by weight on the basis of 100 parts by weight of the binder resin. If the content of the solvent is less than 50 parts by weight, the viscosity of the coating composition is very high, such that a coating property may be poor, and if it is more than 500 parts by weight, film strength of the coating film may be reduced, such that it is difficult to manufacture a thick film.

The solvent may be a single substance selected from $C_1$ to $C_6$ lower alcohols, acetates, ketones, cellosolves, dimethylformamide, tetrahydrofurane, propyleneglycolmonomethylether, toluene, and xylene, or a mixture thereof.

Herein, lower alcohols may be one substance selected from methanol, ethanol, isopropyl alcohol, butyl alcohol, isobutyl alcohol and diacetone alcohol, acetates may be one substance selected from methyl acetate, ethyl acetate, isopropyl acetate, butyl acetate and cellosolveacetate, and ketones may be one substance selected from methylethyltone, methylisobutylketone, acetyl acetone and acetone, but they are not limited thereto.

The composition according to the exemplary embodiment of the present invention may further comprise a UV curing initiator added for the purpose of curing through the irradiation of UV.

The UV curing initiator may be a single substance selected from 1-hydroxy cyclohexylphenyl ketone, benzyl dimethyl ketal, hydroxydimethylacetophenon, benzoin, benzoin methyl ether, benzoin ethyl ether, benzoin isopropyl ether, and benzoin butyl ether, or a mixture of two or more, but is not limited thereto.

It is preferable that the UV curing initiator is added in the amount of 0.1 to 10 parts by weight on the basis of 100 parts by weight of the binder resin. If it is less than 0.1 parts by weight, a sufficient curing may not occur, and if it is more than 10 parts by weight, film strength of the anti-glare film may be reduced.

The composition for the anti-glare film according to the exemplary embodiment of the present invention may further comprise one or more additives selected from a leveling agent, a wetting agent, and an antifoaming agent.

The additive may be added in the amount of 0.01 to 10 parts by weight on the basis of 100 parts by weight of the binder resin.

The leveling agent may make the surface of the coated film coated by using the composition for the anti-glare film according to the exemplary embodiment of the present invention uniform.

Since the wetting agent reduces surface energy of the composition for the anti-glare film according to the exemplary embodiment of the present invention, when the composition for the anti-glare film is coated on a transparent substrate layer, uniform coating may be possible.

The antifoaming agent may be added to remove bubbles in the composition for the anti-glare film according to the exemplary embodiment of the present invention.

In addition, the method for manufacturing the anti-glare film according to the exemplary embodiment of the present invention comprises 1) coating a composition for an anti-glare film which comprises a binder resin, organic particulates, and inorganic particulates and in which differences between refractive indexes of the binder resin and the organic particulates and between refractive indexes of the binder resin and inorganic particulates are each 0.3 or less, on a substrate, and 2) curing the composition.

In the method for manufacturing the anti-glare film according to the exemplary embodiment of the present invention, the configuration of the substrate of step 1) is not particularly limited, and the kind generally used in the art to which the present invention belongs may be used.

For example, it may be formed of a substance selected from triacetylcellulose (TAC), polyethyleneterephthalate (PET), polyethylenenaphthalate (PEN), polycarbonate (PC) and norbonen-based polymer. However, this is not limited thereto, and another substance generally used in the art to which the present invention belongs may be used.

Herein, if the anti-glare film according to the exemplary embodiment of the present invention is applied to a polarizing plate for a display having high resolution, it is preferable that the substrate comprises triacetylcellulose.

The transmissivity of the substrate may be at least 85%, the haze value may be 1% or less, and the thickness may be 30 to 120 μm, but they are not limited thereto.

In the method for manufacturing the anti-glare film according to the exemplary embodiment of the present invention, the coating method of the composition for the anti-glare film of step 1) may be a wet coating method, and examples thereof may comprise a roll coating method, a bar coating method, a spray coating method, a dip coating method, and a spin coating method. The coating method is not limited thereto, and various other coating methods used in the art may be used.

In the method for manufacturing the anti-glare film according to the exemplary embodiment of the present invention, step 2) may be performed in two steps of a drying step and a curing step, or in one step. Herein, the curing step is appropriately performed by using UV.

The curing condition slightly changes depending on a mixing ratio or a component, but in general, in the case of curing by an electronic beam or UV, it is preferable that the curing is performed in the intensity of 200 to 1,000 $mJ/cm^2$ for 1 sec to 10 min.

In the curing by the electronic beam or UV, if the curing time is less than 1 sec, the binder resin is not sufficiently cured, such that mechanical properties such as wear resistance may be poor, and if the curing time is more than 10 min, yellowing may be formed on the transparent substrate layer.

It is apparent that the anti-glare film according to the exemplary embodiment of the present invention may further comprise a separate layer for another purpose in addition to the substrate layer and coating layer.

For example, a contamination prevention layer for preventing contamination on the surface of the display may be further included, and layers for various purposes may be further provided without a limit.

The anti-glare film according to the exemplary embodiment of the present invention may be used for preventing glare by inserting the film to a front side of a flat display having high resolution, and may be applied while not being limited to the kind of display. The display according to the exemplary embodiment of the present invention may have a structure known in the art with the exception of the aforementioned anti-glare coating film. The anti-glare coating film may be disposed at the outermost part of the display watched by an observer.

MODE FOR INVENTION

Hereinafter, the present invention will be described in detail through Examples.

Examples according to an exemplary embodiment of the present invention are set forth to explain the invention in more detail, many modifications thereof may be possible in addition to the following Examples, and the scope of the present invention is not limited to the following Examples.

EXAMPLE

Example 1

The composition for manufacturing the anti-glare film was manufactured by uniformly mixing 10 g of urethane acrylate oligomer as the binder resin, 20 g of dipentaerythritol hexaacrylate (DPHA) as the polyfunctional acrylate monomer; 2 g of polyacrylate-co-styrene particle having the average particle diameter of 3.5 μm and the refractive index of 1.59 as the organic particulate; 2 g of silicon particle having the average particle diameter of 4 μm and the refractive index of 1.43 as the inorganic particulate; 30 g of methylethylketone and 30 g of toluene as the organic solvent; and 2 g of UV curing initiator with each other. Herein, the refractive index of the binder resin is about 1.51 to 1.53.

The film was obtained by coating the liquid composition for manufacturing the anti-glare film manufactured by the above method on the transparent substrate layer (thickness 80 μm) formed of triacetylcellulose by using the roll coating so that the dry thickness was 4 μm, and curing the composition by irradiating UV of 280 mJ/cm$^2$.

Example 2

The anti-glare film was manufactured by manufacturing the composition for manufacturing the anti-glare film in the same manner as Example 1, except that the silicon particle having the average particle diameter of 5 μm and the refractive index of 1.46 was used as the inorganic particulate, and curing the composition by using the same as Example 1.

Comparative Example 1

The anti-glare film was manufactured in the same manner as Example 1, except that 4 g of polyacrylate-co-styrene particle having the average particle diameter of 3.5 μm and the refractive index of 1.59 was used as the organic particulate and the inorganic particulate was not used.

Comparative Example 2

The anti-glare film was manufactured in the same manner as Example 1, except that 4 g of polyacrylate-co-styrene particle having the average particle diameter of 3.5 μm and the refractive index of 1.59 was used as the organic particulate, the inorganic particulate was not used, and the composition was coated so that the dry thickness of the manufactured composition was 10 μm.

Comparative Example 3

After the composition for manufacturing the anti-glare film was manufactured in the same manner as Example 1, except that 3.5 g of polyacrylate-co-styrene particle having the average particle diameter of 3.5 μm and the refractive index of 1.59 was used as the organic particulate and 0.5 g of the silicon particle having the average particle diameter of 4 μm and the refractive index of 1.43 was used as the inorganic particulate, the anti-glare film was manufactured by using the composition.

Experimental Example

The physical properties of the anti-glare film manufactured according to Examples 1 to 2 and Comparative Examples 1 to 3 were measured under the following conditions, and the results are described in the following Table 1.

A. Transmissivity (%)

The transmissivity was measured by using HR-100 manufactured by Murakami Color Research Laboratory Co., Ltd.

B. Haze Value (%)

The haze value was measured by using HR-100 manufactured by Murakami Color Research Laboratory Co., Ltd.

C. 60° reflection brilliance (Gloss)

The 60° reflection brilliance (Gloss) was measured by using the micro-TRI-gloss manufactured by BYK Gardner Co., Ltd.

D. Distinctness-of-Image (%)

The distinctness-of-image was measured by using ICM-1T manufactured by Suga Test Instrument Co., Ltd.

E. Scratch Resistance

After steel cotton wool (#0000) was bound with the hammer of 1 kg and rubbed against the anti-glare film ten times, the scratch resistance was observed.

⊚: number of scratch: 0

○: number of scratch: 5 or less thin scratches having the size of 1 cm or less

Δ: number of scratch: more than 5 thin scratches having the size of 1 cm or less or one to three long scratches having the size of 1 cm or more x: number of scratch: more than 3 long scratches having the size of 1 cm or more F. Pencil Hardness The test was performed three times for each pencil hardness in the load of 500 g to measure the hardness on the basis of ASTM D3363.

G. Crack Resistance

The length of crack was observed through the Mandrel test (1.0 mm).

TABLE 1

| Classification | Example 1 | Example 2 | Comparative Example 1 | Comparative Example 2 | Comparative Example 3 |
| --- | --- | --- | --- | --- | --- |
| Transmissivity (%) | 93.6 | 93.3 | 93.6 | 94.1 | 92.6 |
| Haze value (%) | 9.8 | 10.2 | 11.5 | 11 | 10.0 |
| 60° brilliance | 68 | 66 | 68 | 85 | 70 |
| Distinctness-of-image (%) | 250 | 230 | 250 | 300 | 245 |
| Scratch resistance |  |  | X | ○ | Δ |
| Pencil hardness (500 g load) | 3H | 3H | 2H | 3H | 2H |
| crack resistance | 2.5 cm | 2.5 cm | 2.5 cm | 5.0 cm | 2.5 cm |

As a result of the test, as shown in Table 1, it can be seen that in the case of Examples 1 and 2 formed of the organic particulates and the inorganic particulates, an anti-glare property, distinctness-of-image, pencil hardness, and crack resistance are excellent.

On the other hand, in the case of Comparative Example 1 using only the organic particulates, it can be seen that scratch resistance is reduced, and in the case of in the case of Comparative Example 2 in which only the organic particulates are used and the dry thickness is increased, it can be seen that scratch resistance is slightly improved but crack resistance is reduced. In addition, in the case of Comparative Example 3 in which the inorganic particulates are not sufficiently included as compared to the content of the organic particulates unlike Examples 1 and 2, it can be seen that scratch resistance is reduced.

The invention claimed is:

1. A coating layer for an anti-glare film, comprising:
   a binder resin,
   organic particulates, one or more selected from polystyrene, polymethylmethacrylate, polymethylacrylate, polyacrylate, polyacrylate-co-styrene, polymethylacrylate-co-styrene, polymethylmethacrylate-co-styrene, polycarbonate, polyvinyl chloride, polybutyleneterephthalate, polyethyleneterephthalate, polyamides, polyimides, polysulfone, polyphenylene oxide, polyacetal, epoxy resin, phenol resin, silicon resin, melamine resin, benzoguamine, polydivinylbenzene, polydivinylbenzene-co-styrene, polydivinylbenzene-co-acrylate, polydiallylphthalate and triallylisocyanurate polymer, or two or more copolymers thereof, and
   inorganic particulates, one or more selected from the group consisting of silica, silicon particle, aluminum hydroxide, magnesium hydroxide, alumina, zirconia and titania,
   wherein differences between refractive indexes of the binder resin and the organic particulates and between refractive indexes of the binder resin and inorganic particulates are each 0.3 or less,
   wherein the organic particulate has a spherical shape, and a particle diameter is in the range of 1 to 3.5 µm,
   wherein the inorganic particulate has a spherical shape, and a particle diameter is in the range of 4 to 10 µm, wherein the content of the inorganic particulates is in the range of 20 to 80 parts by weight on the basis of 100 parts by weight of the organic particulates, and
   wherein a thickness of the coating layer for the anti-glare film is in the range of 1 to 4 µm, and the organic particulates and the inorganic particulates form a single particle layer without overlapping of the organic and the inorganic particulates.

2. The coating layer for an anti-glare film according to claim 1, wherein the total content of the organic particulates and the inorganic particulates is in the range of 1 to 30 parts by weight on the basis of 100 parts by weight of the binder resin.

3. The coating layer for an anti-glare film according to claim 1, wherein the binder resin is an acryl-based binder resin.

4. The coating layer for an anti-glare film according to claim 3, wherein the acryl-based binder resin comprises one or more selected from the group consisting of an acrylate monomer and an acrylate oligomer.

5. An anti-glare film comprising the coating layer for the anti-glare film according to claim 1.

* * * * *